(12) United States Patent
Blott et al.

(10) Patent No.: US 11,869,245 B2
(45) Date of Patent: Jan. 9, 2024

(54) MONITORING DEVICE, MONITORING SYSTEM, METHOD, COMPUTER PROGRAM AND MACHINE-READABLE STORAGE MEDIUM

(71) Applicant: Robert Bosch GmbH, Stuttgart (DE)

(72) Inventors: Gregor Blott, Salzgitter (DE); Jan Rexilius, Hannover (DE)

(73) Assignee: Robert Bosch GmbH, Stuttgart (DE)

(*) Notice: Subject to any disclaimer, the term of this patent is extended or adjusted under 35 U.S.C. 154(b) by 164 days.

(21) Appl. No.: 17/437,523

(22) PCT Filed: Mar. 2, 2020

(86) PCT No.: PCT/EP2020/055381
§ 371 (c)(1),
(2) Date: Sep. 9, 2021

(87) PCT Pub. No.: WO2020/182503
PCT Pub. Date: Sep. 17, 2020

(65) Prior Publication Data
US 2022/0148315 A1 May 12, 2022

(30) Foreign Application Priority Data

Mar. 12, 2019 (DE) ...................... 10 2019 203 324.5

(51) Int. Cl.
*G06V 20/52* (2022.01)
*G06T 7/10* (2017.01)
(Continued)

(52) U.S. Cl.
CPC ................ *G06V 20/53* (2022.01); *G06T 7/10* (2017.01); *G06T 7/73* (2017.01); *G06V 10/23* (2022.01);
(Continued)

(58) Field of Classification Search
None
See application file for complete search history.

(56) References Cited

U.S. PATENT DOCUMENTS

2017/0308909 A1* 10/2017 Faith ...................... G06Q 50/01

FOREIGN PATENT DOCUMENTS

DE 102008043954 A1 5/2010

OTHER PUBLICATIONS

Diversity Regularized Spatiotemporal Attention for Video-Based Person Re-identification. Li et al. (Year: 2018).*
(Continued)

*Primary Examiner* — Delomia L Gilliard
(74) *Attorney, Agent, or Firm* — Michael Best & Friedrich LLP

(57) ABSTRACT

The invention relates to a monitoring device (10) for recognizing persons in a monitoring region (2), the monitoring region (2) being video-monitored by means of at least one camera (6) and the camera (6) being designed to provide monitoring images (7) to the monitoring device (10) as video data, the monitoring device comprising: —a feature determination apparatus (13), the feature determination apparatus (13) being designed to determine a feature vector (19) for each object in at least one of the monitoring images (7); —a person recognition apparatus (16), the person recognition apparatus (16) being designed to detect in the monitoring images (7) a person to be recognized (11), on the basis of the determined feature vector and/or the determined feature vectors (19) of the feature determination apparatus (13) and/or a combined feature vector (18); —an association apparatus (14), the association apparatus (14) being designed to determine a feature vector (19) for each person to be recognized (11) and each associated environment object of the person to be recognized (11), the association
(Continued)

apparatus (14) being designed to determine the combined feature vector (18) on the basis of the feature vector (19) of the person to be recognized (11) and the feature vector or the feature vectors (20) of the associated environment objects.

15 Claims, 2 Drawing Sheets

(51) Int. Cl.
*G06T 7/73* (2017.01)
*G06V 10/22* (2022.01)
*G06V 20/40* (2022.01)
*G06V 40/10* (2022.01)

(52) U.S. Cl.
CPC .............. *G06V 20/46* (2022.01); *G06V 40/10* (2022.01); *G06T 2207/10016* (2013.01); *G06T 2207/30196* (2013.01); *G06T 2207/30232* (2013.01)

(56) References Cited

OTHER PUBLICATIONS

Enhancing Person Retrieval with Joint Person Detection, Attribute Learning and Identification. Wu et al. (Year: 2018).*
Translation of International Search Report for Application No. PCT/EP2020/055381 dated May 19, 2020 (1 page).
Wu et al., "Enhancing Person Retrieval with Joint Person Detection, Attribute Learning, and Identification", International Conference on Financial Cryptography and Data Security, 2018, pp. 113-124.
Li et al., "Diversity Regularized Spatiotemporal Attention for Video-based Person Re-identification", IEEE CVF Conference on Computer Vision and Pattern Recognition, 2018, pp. 369-378.

* cited by examiner

MONITORING DEVICE, MONITORING SYSTEM, METHOD, COMPUTER PROGRAM AND MACHINE-READABLE STORAGE MEDIUM

BACKGROUND OF THE INVENTION

What is proposed is a monitoring device.

Video monitoring is used in many locations and in particular in public spaces, for example train stations or airports. Use is in this case also often made of person recognition in video footage. Since the areas to be monitored are often formed over a large area, in order to reduce the data load, it is necessary to keep the resolution of the cameras low. Based on the low resolution, however, it is often difficult to recognize people easily and reliably, since conventional facial recognition methods are in this case often susceptible to errors. Other problems that arise in person recognition in such video recordings are for example high intra-person variance, meaning that for example the same person may look completely different in different cameras. Concealment and significant differences caused by the lighting of the scene also have to be taken into consideration.

Document DE 10 2008 043 954 A1, which most likely forms the closest prior art, describes a sensor network for tracking moving objects in a monitoring area with a plurality of network nodes that are each assigned to a sub-area of the monitoring area. At least one of the network nodes has a classifier generator that is designed to discriminate the assigned sub-areas.

SUMMARY OF THE INVENTION

What is proposed is a monitoring device for person recognition in a monitoring area. Also proposed is a monitoring installation, a method, a computer program and a machine-readable storage medium. Preferred and/or advantageous embodiments of the invention will become apparent from the description, the figures and the dependent claims.

What is proposed is a monitoring device for person recognition in a monitoring area. The monitoring area may comprise an indoor and/or outdoor area. By way of example, the monitoring area is a public area, for example a train station, an airport or a public authority. Person recognition may be used to recognize a person to be sought, definable people and/or multiple people. The people to be recognized may be individual people, groups of people, alternatively also animals and/or objects. By way of example, the recognition of a case and/or object may be considered, in an abstract manner, as person recognition. It is also possible to track and/or follow a person in the monitoring area by way of person recognition. The monitoring device is for example part of a video monitoring installation of the monitoring area and/or designed to be used by security personnel.

The monitoring area is monitored in terms of video technology by at least one camera. The camera may be designed as a color camera, black and white camera and/or infrared camera. The camera is for example arranged in the monitoring area. A multiplicity of cameras may in particular be arranged in the monitoring area, wherein the monitoring sections and/or monitored sections of different cameras may overlap; as an alternative, the sections of different cameras are designed without an overlap. The camera is designed to provide monitoring images to the monitoring device in the form of video data. A multiplicity of video data and/or monitoring images from different cameras are in particular provided to the monitoring device. By way of example, the camera and the monitoring device each have an interface, the interfaces being able to be coupled for data transmission purposes.

The monitoring device has a feature determination apparatus. By way of example, the monitoring device is designed as a computer device. The feature determination apparatus may be designed as a hardware module or as a software module. The feature determination apparatus is designed to determine a feature vector for objects in at least one of the monitoring images. By way of example, one or more objects are depicted in a monitoring image, wherein the feature determination apparatus determines in each case at least one feature vector for the one and/or more objects in the monitoring images. The feature vector may for example comprise shapes, contrasts, patterns and/or further metadata. The feature vector serves to characterize the respective object and may for example have relevance in terms of distinguishing other features. The feature vector should be understood to mean for example a data record that is assigned to an object and/or the objects in a monitoring image. By way of example, the feature determination apparatus is designed to determine the feature vectors for each video image and/or for temporally spaced monitoring images, for example monitoring images spaced in a definable manner.

The monitoring device has a person recognition apparatus. The person recognition apparatus may be designed for example as a software module or as a hardware module. The person recognition apparatus preferably forms a common module together with the feature determination apparatus. The person recognition apparatus is designed to detect a person to be recognized in the monitoring images, based on the one and/or more determined feature vectors and/or a combined feature vector. To this end, the person recognition apparatus accesses in particular the one and/or more feature vectors determined by the feature determination apparatus and for example compares these feature vectors with a combined feature vector. The combined feature vector is provided to the person recognition apparatus. By way of example, for this purpose, all of and/or the feature vector(s) from the feature determination apparatus are compared with the combined feature vector. If a match is present, or a minimum degree of matching, then the object that belongs to this feature vector may for example be understood as a person and/or object to be recognized.

The monitoring device has an association apparatus. The association apparatus may form a software module or a hardware module. It is particularly preferable for the association apparatus to form a common module together with the feature determination apparatus and/or the person recognition apparatus. The association apparatus is designed to determine a respective feature vector for the person to be recognized and for associated surrounding objects of the person to be recognized. In this case, the association apparatus determines, for example, a feature vector for the person to be recognized and, furthermore, a feature vector in particular also for definable, predefined and/or for all of the objects in surroundings of the person to be recognized. The determined feature vectors characterize for example the person to be recognized and/or characterize the surrounding objects associated with the person to be recognized. Associated surrounding objects are for example objects that are located in a perimeter, for example a perimeter at a fixed distance from the person to be recognized, and/or objects that are assigned manually to the person to be recognized. Such objects are in particular other humans, animals or objects such as cases.

The association apparatus is designed to generate and/or to determine the combined feature vector. In this case, the feature vector of the person to be recognized and at least one feature vector of one of the associated surrounding objects are combined. By way of example, for this purpose, it is possible to determine an expanded vector and/or matrix. By way of example, the vector entries of the person to be recognized may be expanded with the vector entries of the associated surrounding objects, for example through addition and/or attachment. The combined feature vector thus comprises features that serve to recognize the person and features of the associated surrounding objects, such that, when recognizing and/or in order to recognize the person, it is possible to use not only the features of the actual person, but features of the surroundings are also added. By way of example, the person to be recognized may be a member of a family that is for example moving as a group through the airport to their gate. Instead of searching only for the sought person in the images, the search may for example be aimed at the group, such that a match with the family members may additionally serve as information and/or an indication of the person to be recognized. As an alternative and/or in addition, a person may be carrying an item of luggage, for example a red case, and transport it in their surroundings and/or put it down. Instead of just searching for the person, expanding the search to the case and/or item of luggage may make the search easier. Objects having a distinguishing feature, for example strong contrast color and/or pattern, are particularly preferred as associated surrounding objects.

The invention is based on the consideration of enabling improved recognition of people in a monitoring area. In this case, algorithms that are already available may for example be applied, this application being expanded with the search for objects in the surroundings. Instead of restricting the search for a person to the individual person and in the process taking into consideration specific properties, such as especially size, gait and clothing, the present invention proposes an expansion to the surroundings of the person in order thereby to make the recognition more robust.

One embodiment of the invention makes provision for the monitoring device to have a selection apparatus. The selection apparatus may be used to graphically, alphanumerically and/or acoustically input data. By way of example, the selection apparatus comprises a touchscreen monitor, a keypad and/or a mouse. A person, for example a user or security personnel, may use the selection apparatus to define the person to be recognized. By way of example, they may mark and/or crop the person in the video recordings that are already present. As an alternative and/or in addition, the person to be recognized may be populated and/or selected as a separate and/or externally procured data record. The associated surrounding objects for the person to be recognized may furthermore be selected by a person and/or by the security personnel using the selection apparatus. By way of example, the user may select and/or crop the associated surrounding objects and/or define them in some other way. It may furthermore be possible for the selection apparatus to be designed for the user to define a perimeter, wherein the selection apparatus selects and/or determines associated surrounding objects that should be understood as being in the perimeter with a defined radius based on machine learning and/or artificial intelligence, for example.

Provision is optionally made for the association apparatus to be designed to determine and/or to select and/or to suggest the associated objects for the person to be recognized based on a policy and/or by way of artificial intelligence. By way of example, the association apparatus may in this case be designed to evaluate video data from the past and/or video data that are currently being and/or still being recorded and, based on the policy and/or the artificial intelligence, to determine which objects, as associated objects, belong to the person to be recognized. Examples of such a selection and/or rules may be the fact that the person to be recognized has been moving with these associated objects, for example people, in the monitoring area for a relatively long time, that a public body, for example registration authority, has provided family members or images thereof, such that these people should be assumed to be associated objects and/or other information. By way of example, the monitoring device is designed to suggest to a user associated objects that the user of the monitoring device is then able to select, in particular graphically.

It is particularly preferable for the association apparatus to be designed to determine and/or to select a search area. By way of example, the search area is able to be input and/or able to be defined by way of the selection apparatus. The search area may comprise a spatial area and/or a temporal range. By way of example, a time window may be defined and/or be able to be defined, wherein the selection, definition and/or search for associated objects are and/or is limited to the time window. As an alternative and/or in addition, the search area may comprise a spatial and/or flat region, wherein the determination, search and/or selection of associated objects is restricted to the region.

Provision is made in particular for the feature vector to be based on and/or to comprise contrast, colors, patterns and/or shapes. By way of example, the feature vector comprises characteristic color profiles and/or patterns of the object and/or person to be found and/or to be recognized. By way of example, the feature vector comprises aspects, eye color, hair color and/or size of the person to be recognized.

By way of example, provision is furthermore made for the feature vector to comprise and/or describe person size information, clothing information, gait information, gender information and/or ethnic information. By way of example, the feature vector may comprise a minimum size, the gender may be male and/or female, the fact that the person is wearing a red jumper and has a gait anomaly. It is possible to recognize and/or compare the objects and/or people by comparing this feature vector with the combined feature vector.

One embodiment of the invention makes provision for the associated objects to comprise for example a companion, an animal and/or an item of luggage. A multiplicity of associated objects may in particular be assigned to the person to be recognized. By way of example, at least three associated objects and/or more than five associated objects are assigned to a person to be recognized. It is in particular observed that the recognition is able to be made more robust by adding multiple associated objects. If multiple associated objects are assigned to a person to be recognized, provision may for example be made for only a subset of the associated objects to be found and/or to be required to be found. By way of example, a person has put down an item of luggage, meaning that this is no longer carried and/or able to be found, while the other family members may still be found in the surroundings.

It is particularly preferable for the combined feature vector to be independent of a spatial arrangement of people to be recognized and associated objects. By way of example, people may move in the surroundings of the person to be recognized, meaning that the sequence and/or arrangement in relation to the person to be recognized is changeable and does not necessarily have to be used for determination and/or comparison with objects in the monitoring images. By way of example, the combined feature vector comprises only information about the fact that the associated objects should and/or have to be present, but not how they are arranged in relation to one another.

The monitoring device in particular has an output apparatus. The output apparatus may for example be a display, for example a screen. As an alternative, the output apparatus may also be a data output module and constitute an interface for retrieving data, for example for a storage medium. The output apparatus is in particular designed to output the monitoring images and specifically to output the monitoring images in which the person to be found has been detected. The output apparatus may especially be designed to indicate and/or to mark the person who has been found in the monitoring image. The output apparatus is especially designed, in addition to the monitoring image and/or the person to be found, to specify data as to where the person to be found is located and/or was located, for example a surrounding area section and/or a room number.

Another subject of the invention is a monitoring installation having at least one camera and the monitoring device as described above. The monitoring installation may be distributed over multiple sections of the monitoring area and/or other areas, for example of a central security monitoring system. The at least one camera and/or multiple cameras are preferably arranged in the monitoring area and monitor the monitoring area using video technology and provide monitoring images. The monitoring device is designed to evaluate the video data and/or monitoring images and for example to determine feature vectors for objects in the monitoring images. The monitoring device compares and/or determines, based on the feature vector and an and/or the associated and/or combined feature vector, in order to detect the person to be found. The monitoring installation is in particular designed such that the cameras are already able to be pre-installed and were part of a monitoring installation, wherein the cameras are connected and/or able to be coupled in terms of data to the monitoring device in the same way as previously.

Another subject of the invention is a method for recognizing a person in a monitoring area. In this case, objects are detected and/or segmented in monitoring images of the monitoring area. Objects in the monitoring images are assigned to feature vectors, wherein these feature vectors for example describe and/or rate a contrast, a color and/or shape. A combined feature vector is formed for a person to be found and/or to be recognized, wherein the combined feature vector comprises the feature vector of the person to be recognized and additionally comprises feature vectors regarding associated objects and/or people associated with this person. The method in particular makes provision for the person to be recognized to be determined based on the feature vector of the objects in the monitoring images and/or the combined feature vector. By way of example, the feature vectors of the one and/or multiple monitoring images are compared with the combined feature vector, wherein the person to be found is defined as being found and/or detected in the event of a match between the feature vector and the combined feature vector.

Another subject of the invention is a computer program for performing the method when the computer program is executed on a computer, the monitoring installation and/or the monitoring device.

Another subject of the invention is a machine-readable storage medium storing the computer program as described above.

BRIEF DESCRIPTION OF THE DRAWINGS

Further advantages, effects and embodiments of the invention will become apparent from the appended figures and the description thereof, in which.

DETAILED DESCRIPTION

Figure 1:
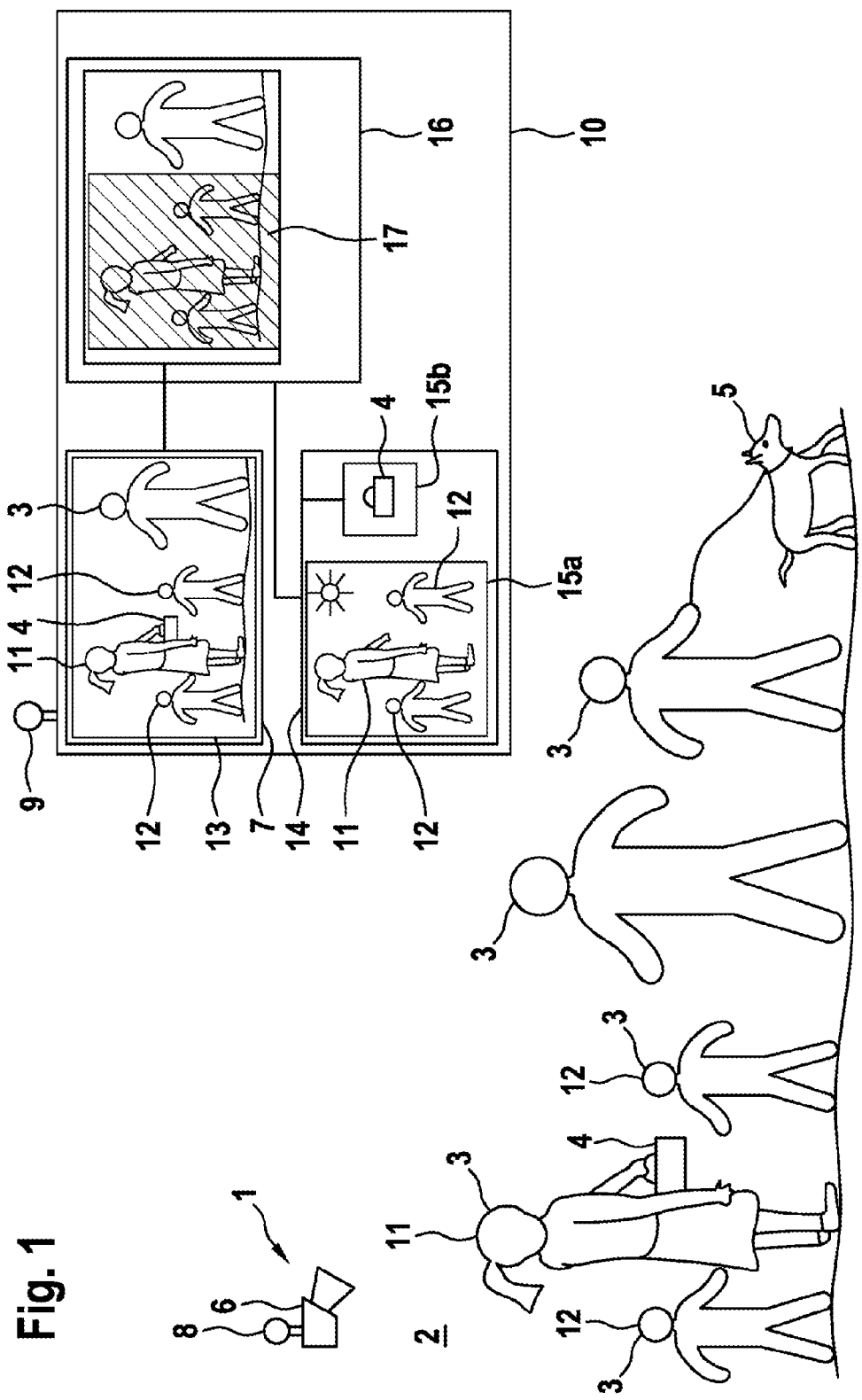
FIG. 1 schematically shows a monitoring installation.

FIG. 1 schematically shows a monitoring installation 1. The monitoring installation 1 serves to monitor a monitoring area 2. The monitoring area 2 is for example a public building, such as an airport. Multiple and/or a large number of people 3 are moving in the monitoring area 2. The people 3 may be carrying objects, such as for example a case 4 and/or an animal 5. The monitoring area 2 is monitored in terms of video technology by way of at least one camera 6. The monitoring camera 6 provides video data containing monitoring images 7 of the monitoring area 2 and/or a section of the monitoring area. The monitoring images 7 depict the people and objects in monitoring images. The camera 6 has an interface 8 for data-based coupling to a further interface 9. The further interface 9 is encompassed by the monitoring device 10. The monitoring device 10 may for example form a computer unit. By way of example, the monitoring device 10 is part of a central security and/or video monitoring system. The monitoring device is designed to find a person 11 to be recognized in the monitoring area 2 based on the monitoring images 7. By way of example, the person 11 to be found is a person who is carrying the case 4 and is accompanied by two children 12. The person 11 to be found is moving through the monitoring area 2 together with the case 4 and the children 12. The monitoring image 7 shows the person 11 to be found, the two children 12 and the case 4 and also another person 3. In order to find the person, the monitoring device has a feature determination apparatus 13. The feature determination apparatus 13 is designed to identify and/or to classify objects for the monitoring image 7 or to segment the image. A respective feature vector is determined for objects in the monitoring image 7. A feature vector is thus determined for example for the depicted person 11, 3 and for the two children 12 and also for the case 4. The feature vector characterizes and/or rates for example shapes, patterns and/or other properties that are able to be depicted in an image and/or able to be rated. A multiplicity of feature vectors is thus present for the monitoring image 7.

The monitoring device furthermore has an association apparatus 14. The association apparatus 14 is designed to generate and/or to provide a combined feature vector. An image 15a and 15b is stored and/or able to be read in the association apparatus 14, for example. By way of example, the image 15a is an image that was recorded at a previous time and shows the person 11 with the children 12. As an alternative and/or in addition, the image 15a may constitute an externally provided image, for example a family picture. The image 15b is furthermore designed to describe and/or characterize the case 4 as carried by the person 11. By way of example, such an image 15b may be taken from a sales catalog or the like. The association apparatus 14 is designed to determine a feature vector for the person 11 and to determine a respective feature vector for the objects associated with them, specifically the children 12 and the case 4.

The combined feature vector comprises the feature vectors of the person 11 and the feature vectors of the children 12 and of the case 4.

The monitoring device has a person recognition apparatus 16. The person recognition apparatus 16 is designed to investigate the monitoring images 7 as to whether the feature vectors that were determined by the feature determination apparatus are able to be combined, in order thus to form the combined feature vector. By way of example, to this end, there is a comparison as to whether all of the feature vectors that were combined in the combined feature vector are able to be found in the monitoring image 7. In the event of a match, the person to be found is considered to be found, wherein, in order to be found, not only was the person detected, but also associated objects were taken into consideration. The monitoring device is in particular designed such that, in the monitoring image, an area 17 is marked in which the person 11 to be found was indicated together with the associated objects 12 and 4.

Figure 2:
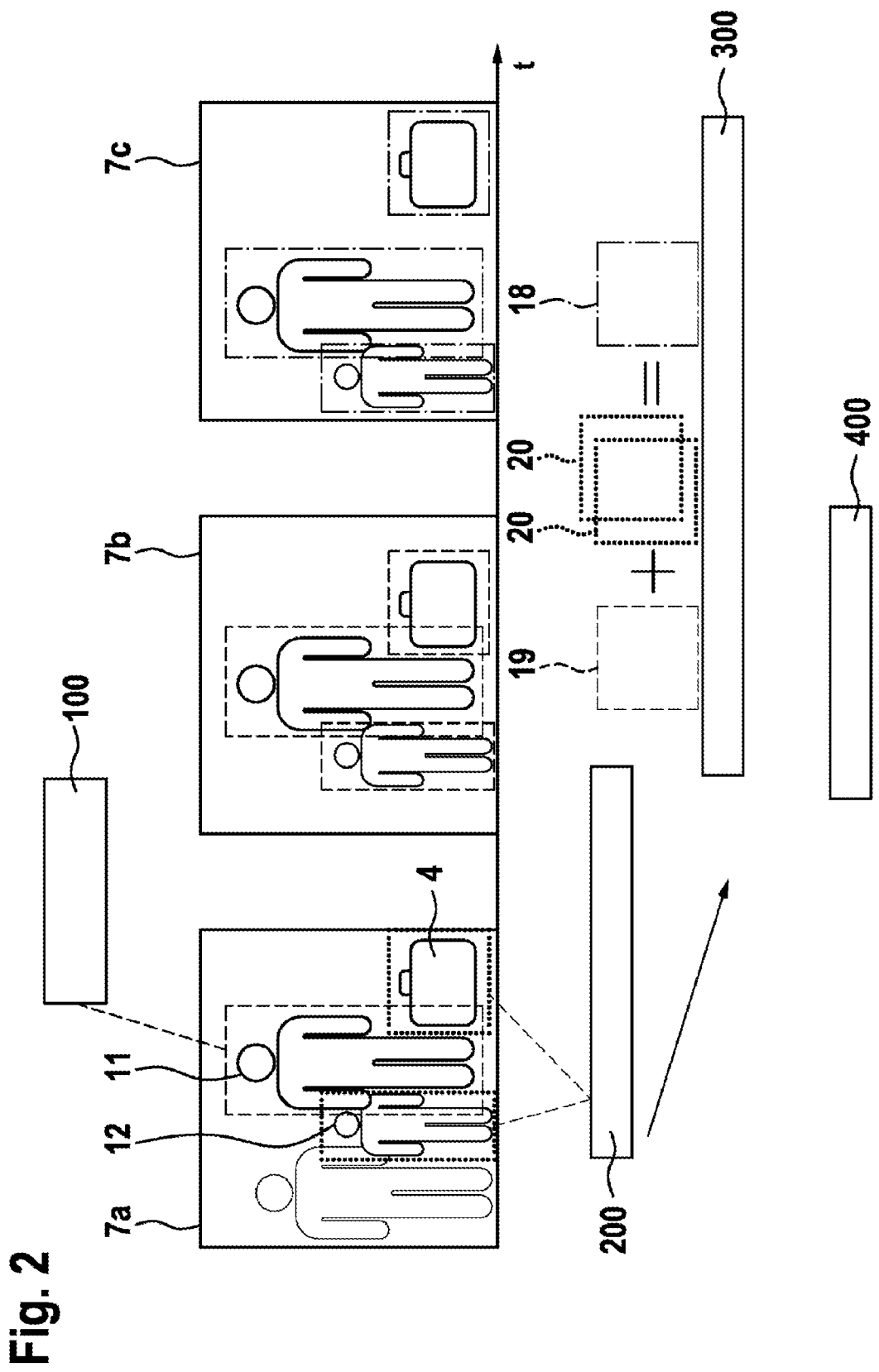
FIG. 2 schematically shows a sequence for recognizing a person.

FIG. 2 schematically shows the sequence for defining associated objects and finding the person 11 to be found. By way of example, the person 11 to be recognized is selected in a first monitoring image 7 by a user. This may be performed for example through a graphical selection and/or cropping in the monitoring image 7. This takes place in a method step 100.

In a further method step 200, the user selects associated objects 12 and 4. This selection of the associated objects 12 is also in particular performed graphically, for example by drawing in the monitoring image 4. The associated object 12 is in this case a child and/or another person, with the associated object 4 being an item of luggage carried by the person 11.

In a method step 300, the combined feature vector 18 is formed. The combined feature vector 18 is in this case formed from the feature vector 19 of the person 11 to be found and the two feature vectors 20 of the associated objects 12 and 4.

The search with regard to the person 11 to be found is performed in method step 400. In this case, the following monitoring images 7b and 7c are investigated for the presence of the combined feature vector 18. As may be seen on the basis of image 7b and 7c, the spatial arrangement of the associated objects 12 and 4 with regard to the person 11 to be found is irrelevant to the combined vector 18, meaning that the person 11, together with the associated objects 4 and 12, is found even when the case 4 is for example further away from the person 11 to be found. If the person 11 to be found is detected and/or the combined feature vector 18 is found, then this image, in particular also containing the displayed area and/or position information, may be output in the monitoring area, for example on a graphical output unit.

The invention claimed is:

1. A monitoring device (10) for person recognition in a monitoring area (2),
    wherein the monitoring area (2) is monitored in terms of video technology by at least one camera (6) and the at least one camera (6) is configured to provide monitoring images (7) to the monitoring device (10) in the form of video data,
    having a feature determination apparatus (13), wherein the feature determination apparatus (13) is configured to determine a respective feature vector (19) for objects in at least one of the monitoring images (7),
    having a person recognition apparatus (16), wherein the person recognition apparatus (16) is configured to detect a person (11) to be recognized in the monitoring images (7) based on (a) at least the feature vector (19) of the feature determination apparatus (13), (b) a combined feature vector (18), or both (a) and (b),
    having an association apparatus (14), wherein the association apparatus (14) is configured to determine a respective feature vector (19) for the person (11) to be recognized and associated surrounding objects of the person (11) to be recognized, wherein the association apparatus (14) is configured to determine the combined feature vector (18) based on the feature vector (19) of the person (11) to be recognized and the one or more feature vectors (20) of the associated surrounding objects, and
    having a selection apparatus, wherein the person (11) to be recognized, the associated surrounding objects belonging to the person (11) to be recognized, or both are able to be defined or selected by way of a user input to the selection apparatus.

2. The monitoring device (10) as claimed in claim 1, wherein the selection apparatus includes at least one from a group consisting of: a touchscreen monitor, a keypad, and a mouse for selecting the person (11) to be recognized.

3. The monitoring device (10) as claimed in claim 1, wherein the association apparatus (14) is configured to determine the associated objects for the person (11) to be recognized based on a policy.

4. The monitoring device (10) as claimed in claim 3, wherein the association apparatus (14) is configured to restrict a search area for determining the associated objects by way of a search criterion that includes time and surrounding radius.

5. The monitoring device (10) as claimed in claim 1, wherein the feature vector (19) is based on contrast, colors, patterns, or a combination of the same.

6. The monitoring device (10) as claimed in claim 1, wherein the feature vector (19) includes gait information.

7. The monitoring device (10) as claimed in claim 1, wherein the associated objects comprise at least one selected from the group consisting of a companion, and an animal (5).

8. The monitoring device (10) as claimed in claim 1, wherein the combined feature vector (18) is independent of an arrangement of the associated objects around the person (11) to be recognized.

9. The monitoring device (10) as claimed in claim 1, further comprising an output apparatus, wherein the output apparatus is configured to indicate the person (11) to be found detected in the monitoring images (7).

10. A monitoring installation (1) having at least one camera (6) and the monitoring device (10) as claimed in claim 1, wherein the video data are provided to the monitoring device (10).

11. The monitoring device (10) as claimed in claim 1, wherein the association apparatus (14) is configured to determine the associated objects for the person (11) to be recognized by way of artificial intelligence.

12. A method for recognizing a person (3) in a monitoring area (2), the method comprising:
    segmenting objects in monitoring images (7) of the monitoring area (2),
    feature vectors (19) to the objects in the monitoring images (7),
    selecting a person (11) to be recognized from an input by a user,
    forming a combined feature vector (18) for the person (11) to be recognized, wherein the combined feature vector (18) comprises the feature vector (19) of the person (11) to be recognized and additional feature vectors (20) regarding associated objects, and determining the person (11) to be recognized based on (a) the feature vector (19) of the objects in the monitoring images (7), (b) the combined feature vector (18), or both (a) and (b).

13. The method according to claim 12, wherein the selecting of the person (11) to be recognized by a user includes the user providing an input using at least one from a group consisting of: a touchscreen monitor, a keypad, and a mouse to select the person (11) to be recognized.

14. The method according to claim 12, wherein the selecting of the person (11) to be recognized is provided by an acoustic input from the user to a selection apparatus.

15. A non-transitory, computer-readable storage medium containing instructions that when executed by a computer cause the computer to segment objects in monitoring images (7) of a monitoring area (2), assign feature vectors (19) to the objects in the monitoring images (7), receive a selection for a person (11) to be recognized that is input by a user into a selection apparatus, form a combined feature vector (18) for the person (11) to be recognized, wherein the combined feature vector (18) comprises the feature vector (19) of the person (11) to be recognized and additional feature vectors (20) regarding associated objects, and determine the person (11) to be recognized based on (a) the feature vector (19) of the objects in the monitoring images (7), (b) the combined feature vector (18), or both (a) and (b).

\* \* \* \* \*